(No Model.)  
T. M. HOVELL.  
ANIMAL TRAP.  
3 Sheets—Sheet 2.
No. 502,254. Patented July 25, 1893.
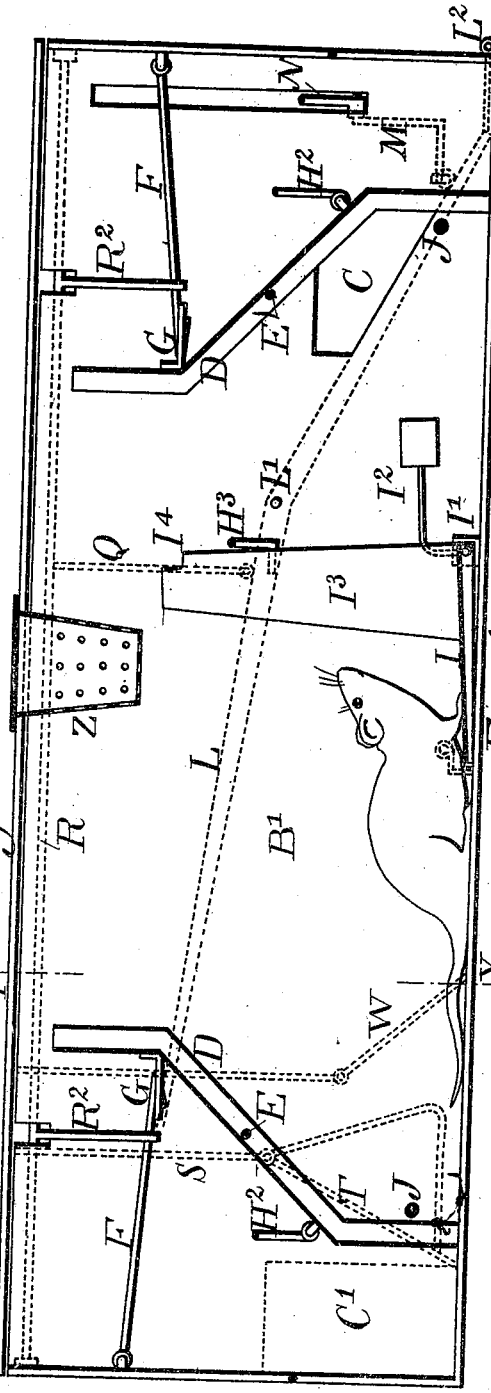
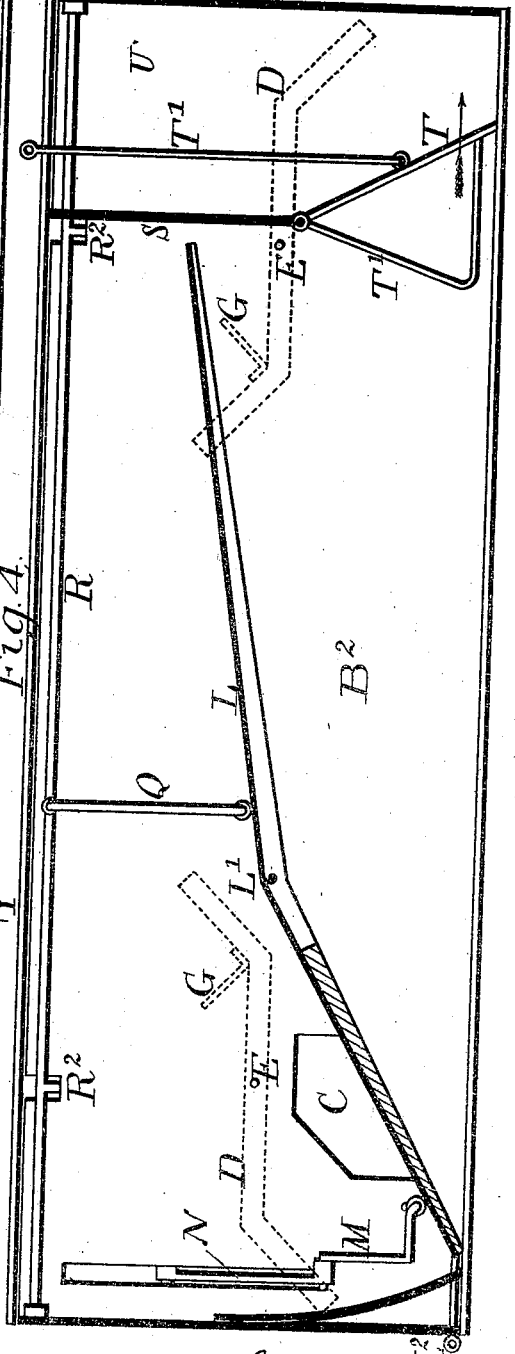
Witnesses:  
G. W. Rea.  
J. A. Saul.
Inventor:  
Thomas M. Hovell,  
By James L. Norris  
Atty.

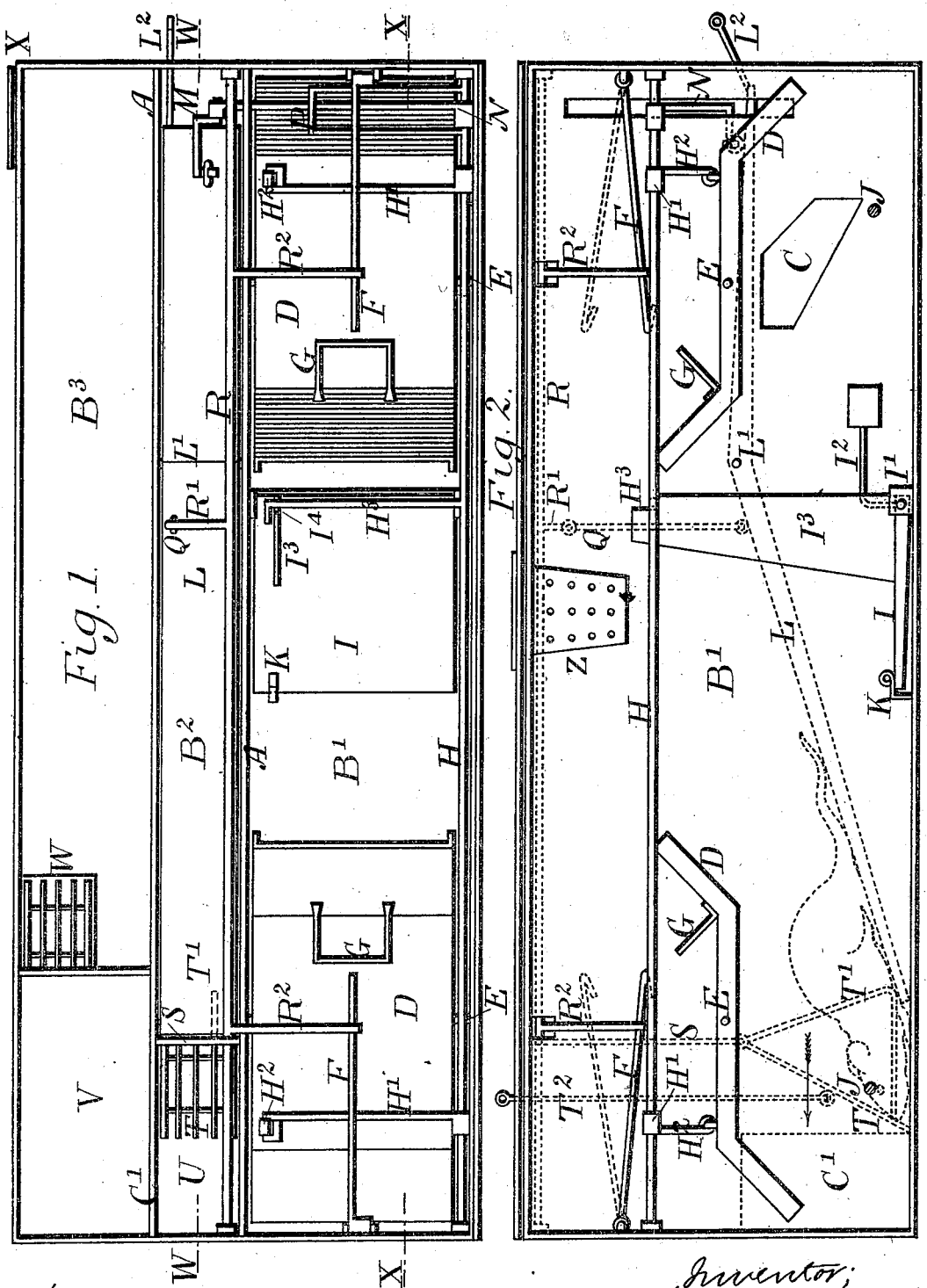

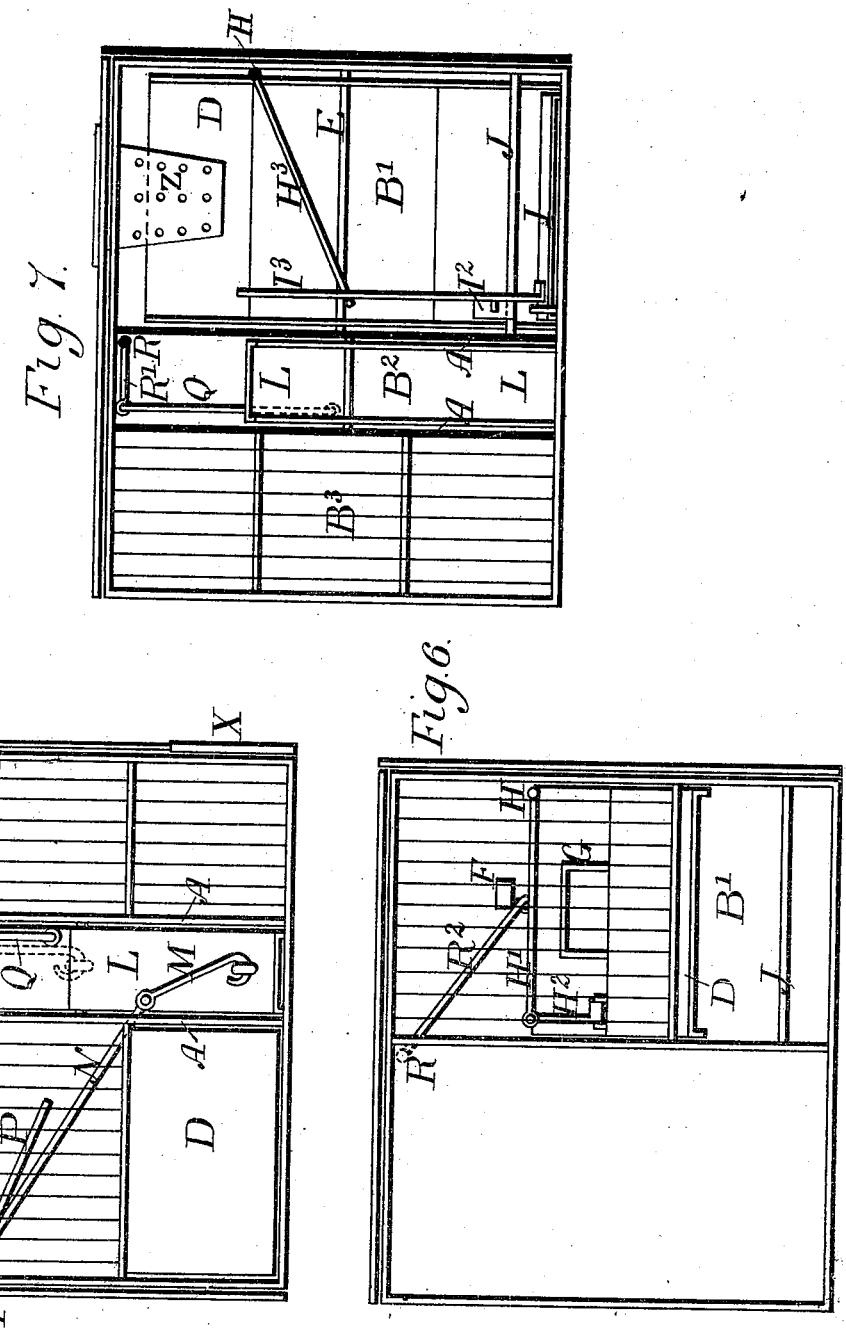

United States Patent Office.

THOMAS MARK HOVELL, OF ELSTREE, ASSIGNOR OF ONE-HALF TO FRANK BERTRAM CHARLTON, OF LONDON, ENGLAND.

ANIMAL-TRAP.

SPECIFICATION forming part of Letters Patent No. 502,254, dated July 25, 1893.

Application filed March 28, 1893. Serial No. 468,001. (No model.)

*To all whom it may concern:*

Be it known that I, THOMAS MARK HOVELL, gentleman, a citizen of England, residing at Boreham Holt, Elstree, in the county of Herts, England, have invented certain new and useful Improvements in Animal-Traps, of which the following is a specification.

My invention relates to an improved construction of animal trap, wherein first two open doors situated at opposite ends of one compartment of the trap are simultaneously closed by the entrance of an animal into the said compartment, and secondly, by the further passage of the animal through the trap, it is made to operate other mechanism whereby the two doors are simultaneously automatically opened again, and the trap is thus reset for the entrance of another animal. For these purposes the trap is constructed of three separate compartments arranged longitudinally side by side. The first compartment has at each end a pivoted door so arranged as either by gravity or by spring action to close automatically when left to themselves. In the middle of the compartment is a pivoted platform or treadle which is so connected by a catch or detent with a longitudinal spindle and lever arms connected to the doors, that on the animal entering the compartment and treading on the treadle, this is moved so as to release the spindle and allow the doors to close down, the doors being locked in such closed position by catches. In the side wall of the said compartment is an opening through which the animal, finding the doors closed, will pass into the second compartment. In this compartment is a device which when acted upon by the weight of the animal is made to actuate the spindle in the first compartment so as to reset the doors in the open position. Such device consists by preference of a sway beam constituting the floor, and supported by horizontal pivots at an intermediate point of its length so that the end thereof near the before mentioned side opening lends either by gravity or by spring action to remain in the lowered position while the other end is thus held in a raised position; on the animal entering this second compartment it will run up the inclined sway beam, and by its weight will cause the raised end to descend thereby raising the other end. By such upward motion, this end is made, by a suitable lever connection with the before mentioned spindle, to turn this and thereby cause it to open both doors so as to reset the trap. The sway beam also actuates a second spindle connected to the catches of the doors, so that such catches are disengaged before the doors are opened. The animal after actuating the sway beam as described passes through a door into the third compartment, and the sway beam, relieved of its weight, falls back into its original position, ready to be acted upon by the next animal caught.

I will now proceed to describe a special construction of the trap operating in the above described manner for which purpose I will refer to the accompanying drawings, in which—

Figure 1 shows a plan of the trap with the top plate removed. Fig. 2 shows a side view of compartment B' with the side plate removed; Fig. 3 a longitudinal section through compartment B' on line X X Fig. 1. Fig. 4 shows a longitudinal section through compartment B² on line W W Fig. 1 looking toward compartment B'. Fig. 5 shows one end view of the trap with the doors of compartment B' closed. Fig. 6 shows the opposite end view with the doors of B' open, and Fig. 7 shows a cross section at Y Y Fig. 3.

The trap, which may either be of wire, as shown or of other suitable material, is divided by two partition walls A A into three compartments B', B², B³, B' being made to communicate with B² by an opening C, and B² with B³ by opening C'. The compartment B' has its two ends closed by two doors D D which are pivoted at E to the sides, the pivots being so arranged relatively to the center of gravity of the doors, that these always tend to turn into the closed position shown at Fig. 3. When in the closed position the doors are prevented from being pushed open by the animal in the compartment, by hooked catches F, pivoted to the ends of the cage and hooking into loops G on the upper parts of the doors. For enabling the doors to be opened, these hooks are first raised out of the loops as will be presently described.

Along the side of the compartment B' extends a horizontal spindle H, turning on pivots at the ends and having first two arms H' H' that are connected by rods H² to the lower ends of the doors D, and secondly it has an arm H³ at or about the middle of its length. Beneath this arm is a treadle I pivoted at I' and weighted by an arm I² in such manner that it tends to remain in the raised position shown at Fig. 2. Projecting upward from this treadle is a post I³ having a shoulder I⁴ at its upper end. The post I³ bears up against the arm H³ of the spindle H when it is in the lowered position as indicated at Figs. 3 and 7 which arm consequently prevents the post I³ and treadle I from entirely assuming the raised position, until the arm H³ is raised up to the level of the shoulder I⁴, when the treadle will be free to rise slightly and will thus bring the shoulder I⁴ underneath the arm H³, in which position of the said arm the spindle H will be turned so as to hold the doors D in the open position as at Fig. 2 and consequently the doors will be locked in such open position so long as the post I³ is engaged with the arm H³, that is to say, so long as the treadle I is not depressed by an entering animal. When this is done, the arm H³, in losing its support, drops, allowing the spindle H to turn and the doors D to close. The doors are then locked in such closed position by means of the hook-shaped catches F which engage with wire loops G at the upper parts of the doors. Balking bars J are provided at a certain height immediately inside the doorways in order to impede the progress of the animal in endeavoring to rush right through the compartment before the doors have had time to close down entirely and become locked. The treadle I is prevented by a stop K from being moved over beyond the above mentioned horizontal position by the weighted arm I².

In the second compartment B² a sway beam L is pivoted at L' to the sides of the compartment and so weighted at its right hand end that it tends to assume the position shown at Figs. 3 and 4. When the beam is in this position it will be seen that its inclined surface corresponds with the lower edge of the side opening C. To the left hand end of the sway beam at Fig. 4 is pivoted a rod M the upper end of which is pivoted to an arm N that passes through a slot in the partition and has its other end pivoted loose upon the spindle H. This arm is situated beneath a wire loop P fixed on the spindle H, so that when this end of the beam L is made to rise, as shown at Fig. 2, the rod M and arm N in lifting the loop P, turn the spindle H in its bearings and thereby first cause it to raise the doors D into the open position by means of the lever arms H' and rods H² and secondly to bring its arm H³ above the post I³ so as to engage with the shoulder I⁴ of the latter, as before described and shown at Fig. 2. To the beam L is furthermore pivoted at a point beyond its pivot L', a rod Q pivoted at its upper end to an arm R' fixed on a spindle R extending along the compartment B², and free to turn in bearings at its ends. To this spindle is fixed other arms R² that project through slots in the partition wall A, and are pivoted to the catches F. Thus it will be seen that as the right hand end of the beam L rises as above described, the left hand end in descending will effect the turning of the spindle R by the rod Q and arm R' and by this means the arms R² will be made to raise the catches F off the loops G of the doors D before the arm N in rising has come in contact with the loop P of spindle H, and consequently before this is turned for raising the doors.

Near the right hand end of compartment B² at Fig. 4 is a transverse partition S having an opening at bottom which is closed by a sloping wire door T, hinged at its upper end and resting free on the floor of the compartment at its lower end, so that it can be readily pushed open in the direction of the arrow Figs. 2 and 4 by an animal on the inner side of the door. This door has a wire catch or pawl T' which, when the left hand end (Fig. 2) of the beam L is depressed, automatically passes over its end and thus locks the beam in this position, in which it will be seen that the right hand end of the beam (Fig. 2) is raised above the opening C, and consequently an animal contained in compartment B² cannot pass back into compartment B'. When however the animal pushes open the door T and passes out through the same, the beam L will be liberated from the catch T' and will consequently be free to fall back into the position shown at Figs. 3 and 4. In so falling back, the beam draws downward the lever arm N again leaving the looped arm P and spindle H in the position in which they had previously been moved so that the trap will now have been automatically reset in its original position with the parts as shown at Fig. 4. The space U in compartment B² beyond the door T communicates with a space V of the compartment B³ by the before mentioned opening C', and the space V communicates with the other part of the compartment B³ by a sloping wire door W. At the other end the compartment B³ has a sliding door X through which the animals contained therein are removed.

From the above description, the action of the trap will readily be seen to be as follows:— The trap being set, with the parts in the positions at Fig. 2, and suitably baited, in a perforated receptacle at Z, an animal entering compartment B' (which it will readily do on seeing a clear way through the two open doors) will depress treadle I and thereby cause the two doors to fall quickly into the closed position, as at Fig. 3. The animal then seeing no other opening for escape than the opening C, will pass through the latter into compartment B² on to the beam L. Here it will run up the beam which will consequently be overbalanced at the raised end and will descend into the position at Fig. 2. In doing this the beam will automatically reset compartment B' as described. The animal in pushing through door T will thereby release the beam L which will consequently resume its "set" position so that the trap is now completely reset as at Fig. 4. The animal will then pass through opening C' and door W into compartment B³.

The beam L has a projecting wire L² at the right hand end, and the door T has a wire T² projecting up through the top, so as to enable the trap to be set by hand, in the first instance, or in the event of the treadle I being accidentally depressed without an animal being in the compartment B².

Having thus described the nature of my said invention and the best means I know for carrying the same into practical effect, I claim—

1. In an animal trap the combination of a compartment having two opposite doors, a treadle operated by an entering animal, a catch on said treadle which holds the two doors open when the treadle is in a raised position and which allows the doors to close simultaneously when the treadle is depressed, a second compartment communicating with the first one and containing a sway beam or equivalent device connected by rods and lever arms with the doors of the first compartment, so that on the sway beam being actuated by the weight of the animal the doors are raised to the open position thereby, substantially as described.

2. In an animal trap the combination of a compartment having two opposite doors, a treadle operated by an entering animal, a catch on said treadle which holds the two doors open when the treadle is in a raised position and which allows the doors to close simultaneously when the treadle is depressed, a second compartment communicating with the first one and containing a sway beam or equivalent device connected by rods and lever arms with the doors of the first compartment, so that on the sway beam being actuated by the weight of the animal the doors are raised to the open position thereby, and locking catches for holding the doors in the closed position, also actuated by the sway beam for releasing the doors before being opened thereby, substantially as described.

3. In an animal trap, the combination of a compartment B' having a door D at each end, a spindle H connected to the said doors by rods and levers, a weighted treadle I with post I³ engaging with an arm on the spindle H so as to hold the doors in the open position, catches F for locking the doors in the closed position, a second compartment B² communicating with the first compartment by an opening C and containing a weighted sway beam L connected first to spindle H by rods and levers so as by its motion to effect the opening of the doors D, and secondly to a spindle R, having arms connected to the catches F so as to disengage these from the doors before they are opened, and a third compartment B³ separated from the second compartment by a door on the opening of which the sway beam L is liberated so as to resume its original position, substantially as described.

In testimony whereof I have signed my name to this specification, in the presence of two subscribing witnesses, this 14th day of March, A. D. 1893.

T. MARK HOVELL.

Witnesses:
　THOMAS LAKE,
17 Gracechurch Street, London.
　JNO. P. M. MILLARD,
Clerk to Messrs. Abel & Imray, Consulting Engineers and Patent Agents, 28 Southampton Buildings, London, W. C.